United States Patent
Han

[19]

[11] Patent Number: 5,816,005
[45] Date of Patent: Oct. 6, 1998

[54] PRE-FABRICATED TITLE BOARD

[76] Inventor: Eddie Eui In Han, 171 Pier Ave., Suite 107, Santa Monica, Calif. 90405

[21] Appl. No.: 711,369

[22] Filed: Sep. 4, 1996

[51] Int. Cl.[6] .................................................. E04F 13/08
[52] U.S. Cl. .............................. 52/391; 52/389; 52/791.1; 52/793.1; 52/390
[58] Field of Search ......................... 52/389–391, 793.1, 52/314, 315, 791.1, 797.1, 783.11

[56] References Cited

U.S. PATENT DOCUMENTS

| | | | |
|---|---|---|---|
| 3,740,911 | 6/1973 | O'Leary | 52/391 X |
| 4,128,982 | 12/1978 | Weaver | 52/389 X |
| 4,324,605 | 4/1982 | Bethea | 52/389 X |
| 4,567,704 | 2/1986 | Bernett et al. | 52/390 X |
| 4,642,960 | 2/1987 | Wallover, III | 52/390 |
| 4,699,677 | 10/1987 | Rookyn | 52/390 X |
| 4,920,716 | 5/1990 | Coffey | 52/389 X |
| 5,052,161 | 10/1991 | Whitacre | 52/389 X |
| 5,238,721 | 8/1993 | Nakazawa | 52/391 X |
| 5,255,482 | 10/1993 | Whitacre | 52/389 |
| 5,271,200 | 12/1993 | Witt | 52/391 |
| 5,590,500 | 1/1997 | McCue | 52/482 X |

*Primary Examiner*—Christopher Kent
*Assistant Examiner*—Yvonne Horton-Richardson
*Attorney, Agent, or Firm*—Sanford Astor

[57] ABSTRACT

A building material comprising, in layers, a thin waterproof membrane base of rigid plastic such as PVC, a mortar bed, a layer of cement, a metal lath, and a layer of ceramic tile, brick-veneer, granite tile or marble tile, which provides a pre-fabricated panel adapted to be attached to any flat surface, such as a wall or counter.

7 Claims, 27 Drawing Sheets

FIG. 1
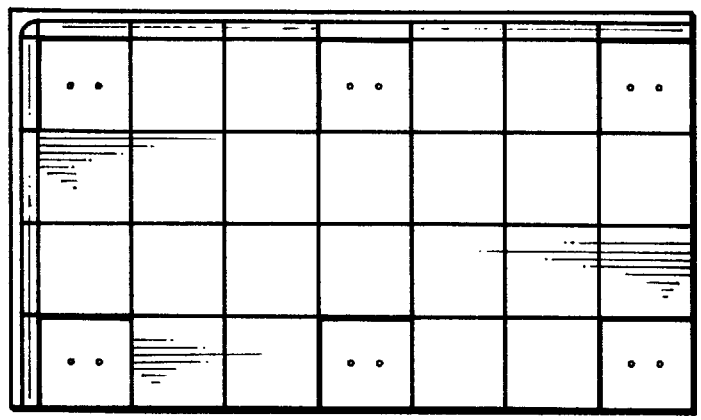
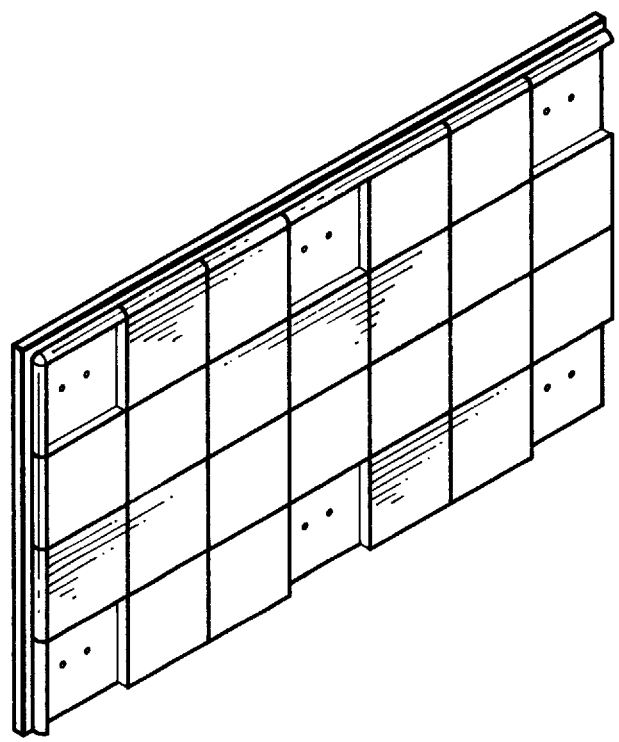
FIG. 1A
FIG. 1B

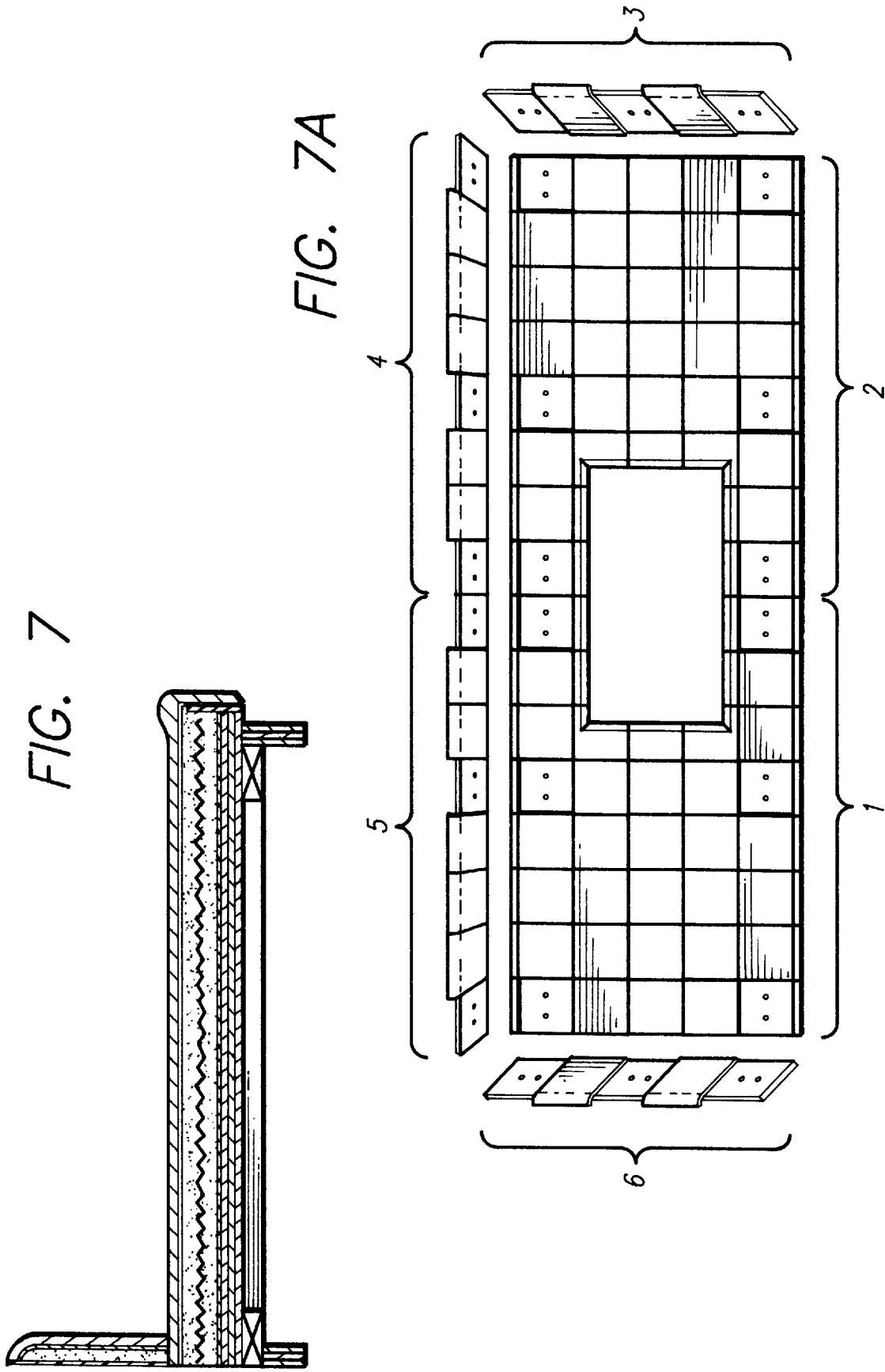

PRE-FABRICATED TITLE BOARD

BACKGROUND OF THE INVENTION

The invention relates to the installation of ceramic tile, brick-veneer, granite tile or marble tile. These building materials are commonly used in shower enclosures, bathroom, bathtub or kitchen walls and counters.

The usual method for installation of tile, and the like in locations such as bathrooms or kitchens, involves installing a membrane of roofing felt or polyethylene film over wood or metal studs. Then, galvanized or painted expanded metal lath is installed. Next, there is applied a scratch coat of a cement mixture which is then allowed to cure for a minimum of 20 hours at 70 degrees F or above. Next, a mortar bed is installed and it is also then allowed to cure for a minimum of 20 hours at 70 degrees F or above.

After all these steps have been accomplished, the tile is applied with dry-set or cement mortar as a bonding coat on the cured bed of mortar. The bond coat is allowed to cure for a minimum of 24 hours at 70 degrees F or above and then grout is applied with dry-set grout For a shower enclosure, other preparations must be done, such as installing a waterproofing shower pan, by applying a hot mop (hot asphalt) on the shower floor and dam, or applying a shower pan liner membrane. The shower pan and drain fittings must be tested by filling with water and testing for leaks and waiting 24 hours before laying the tiles. This method requires at least two persons (tile installer and helper) and it usually takes at least four days to complete an average 60 to 100 square feet of tile installation and it is very, very messy work.

Another method of installing tile involves using cementitious backer board. This material can be applied over wood or metal studs and ceramic tile can be bonded to it with dry-set, latex, or cement. An average 60 square feet of bathtub walls can be completed in two days, a shower enclosure, three days. This is still very messy work.

In both methods described above, the tiles must be trimmed for every corner and surrounding plumbing fixtures, producing an enormous amount of waste. Tools and buckets must be washed constantly to get rid of dry-set, latex cement, and grout, all of which have a high alkali content, usually with no appropriate place to wash and discharge it. Thus, it is often discharged into the ground or sewer system. When a cement mixer is used, it must be washed constantly and polluted water is discharged, untreated, into the ground or the sewer system. Thus tile installation, as it is done today, is not only very, very messy work, but it produces enormous amounts of contaminants.

OBJECTS OF THE INVENTION

Accordingly, several objects and advantages of the invention are as follows:
  to provide a simple and easy method to install tile type building materials which is environmentally favorable;
  to provide a clean and fast way to install tile type building materials;
  to provide a less expensive way to install tile type building materials;
  to provide pre-fabricated tile type building material panels which are easily installed.

SUMMARY OF THE INVENTION

The invention comprises a pre-fabricted board or sheet of tile type building material adapted to be installed in a bathroom or kitchen, in panels, to make installation far faster and easier than the present method where the tiles are all individually installed at the site. The tile board or panel comprises, in layers, a thin waterproof membrane base of rigid plastic such as PVC, a mortar bed, a layer of cement, a metal lath, and a layer of ceramic tile, brick-veneer, granite tile or marble tile, which provides a pre-fabricated panel adapted to be attached to any flat surface, such as a wall or counter.

BRIEF DESCRIPTION OF THE DRAWINGS

FIG. 1 is front view of a tile board of this invention;

FIG. 1A is a perspective view thereof;

FIG. 1B is a cross-sectional view of FIG. 1;

FIG. 6B through 6O are all perspective views showing a step by step installation of the tileboards of this invention in which;

FIG. 6B shows the first board installed;

FIG. 6I shows the tile filled on fifth board and the sixth board installed;

FIG. 6O shows the tenth board filled with tile;

FIG. 7 is a cross-section of tile board over a counter top; and

FIG. 7A is a cross-section showing completion of the counter top.

DETAILED DESCRIPTION OF THE INVENTION

Figure 2:
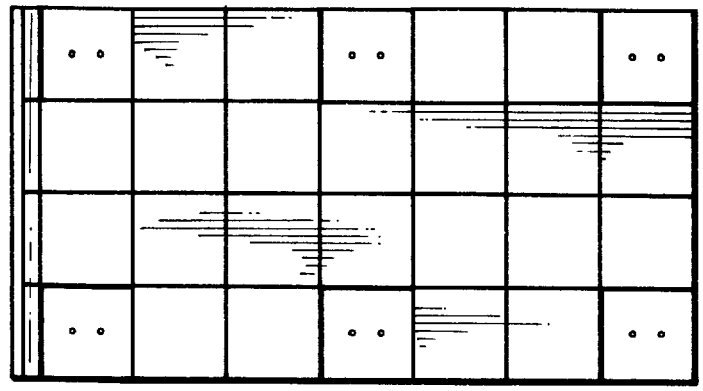
FIG. 2 is a front view of a tile board for corners.
Figure 2A:
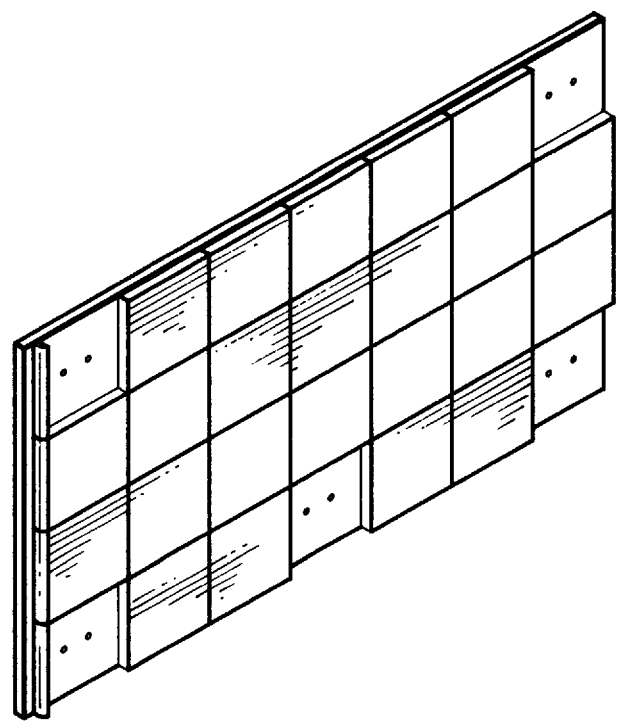
FIG. 2A is a perspective view thereof.
Figure 2B:
FIG. 2B is a cross-sectional view of FIG. 2.
Figure 2C:
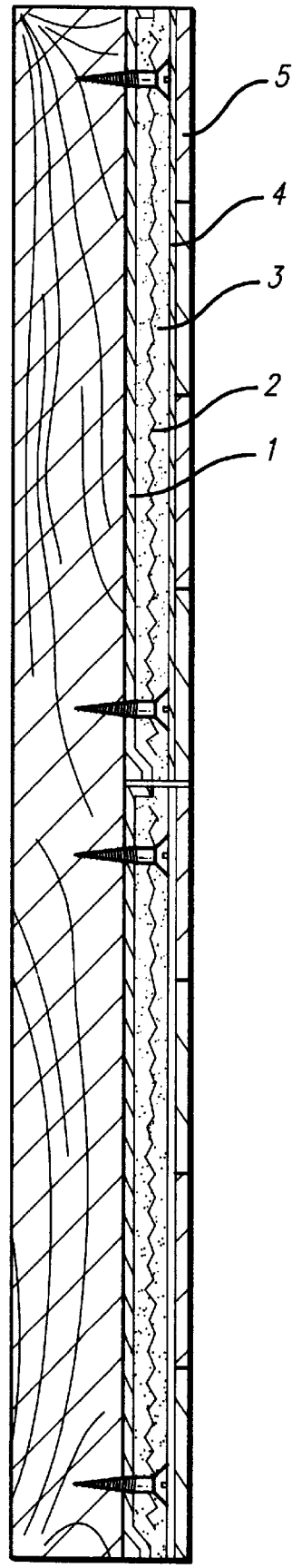
FIG. 2C is a is cross-sectional view of a tile board over another tile board.

Referring now to the drawings there is shown the multiple layers which comprise the pre-fabricated tile boards of the invention. The reference numerals refer to the base of the tile board or membrane 1, the reinforcement or metal lath 2, a first mortar bed 3, or scratch coat 3a, a thin bond coat 4, and the ceramic tile, brick veneer, granite tile or marble tile layer 5. In another embodiment there is a cementitious backer board underlayment 6 or a reinforced cementitious backer board underlayment 7. These layers are more fully explained below.

Figure 2D:
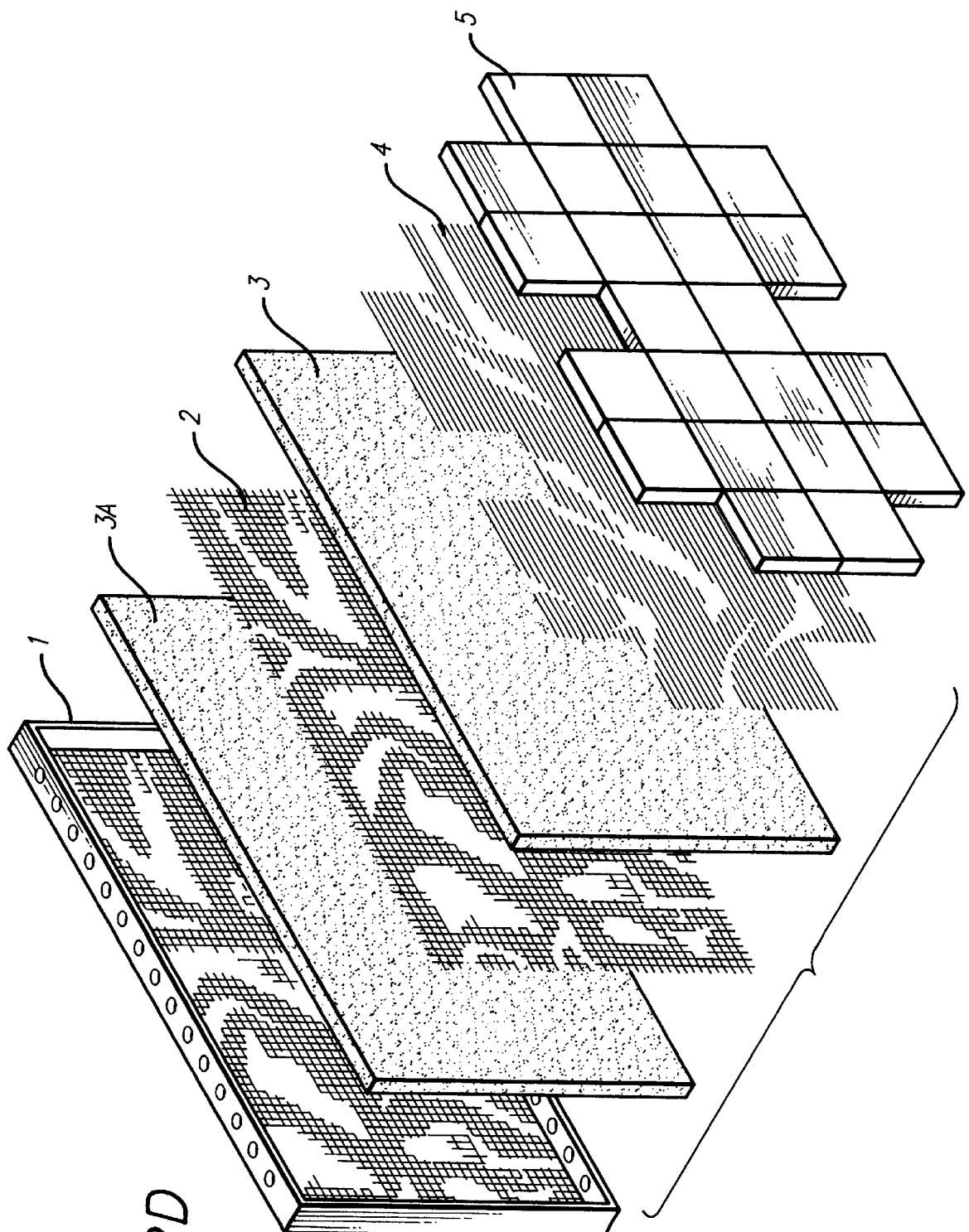
FIG. 2D is an isometric exploded view of a tile board for wood or metal studs.

As is shown most specifically in FIG. 2D, a thin base of rigid plastic, such as PVC, forms the base 1. The plastic base has a honeycombed shaped bottom with punched walls on the top and bottom. A first scratch coat of mortar bed 3a fills the honeycomb shaped bottom of base 1. The mortar is commonly comprised of one part cement, one-half part lime, and four parts dry sand or five parts damp sand. It may also be composed of one part cement and three parts dry sand or four parts damp sand. The type of cement used may be any commonly available cement, such as portland cement.

A sheet of galvanized metal lath 2 is the next layer. This is usually 2.5 pounds per square yard. A second coat of mortar bed 3 is the next layer. It is composed of one part cement, one-half to one part lime and five to seven parts damp sand. It is normally cured for a minimum of 20 hours at 70 degrees F or above.

A thin coat of cement 4 is the next layer, which acts as a bond coat on mortar bed 3. Layer 4 can also be a thin coat of dry-set or latex cement mortar. The tile, brick veneer or other tile type building material is layer 5 which is the top layer.

Figure 2E:
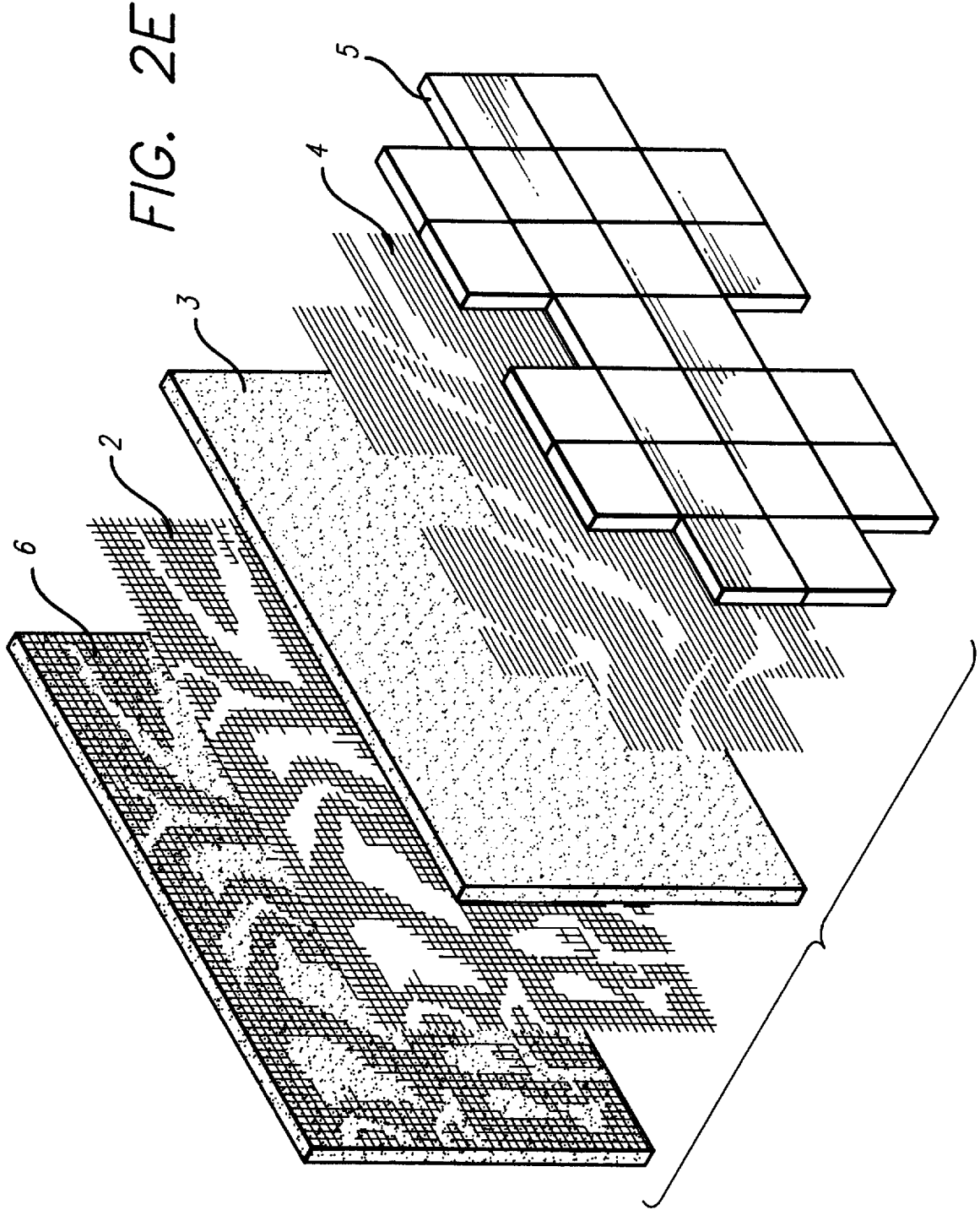
FIG. 2E an isometric exploded view of a tile board using a cementitious baker unit as a base.

An additional embodiment is shown in FIG. 2E, which comprises a cementitious backer board 6, the sheet of galvanized metal lath 2, a coat of mortar bed 3, a thin coat of cement 4, or dry-set or latex cement, as set forth above.

Figure 2F:
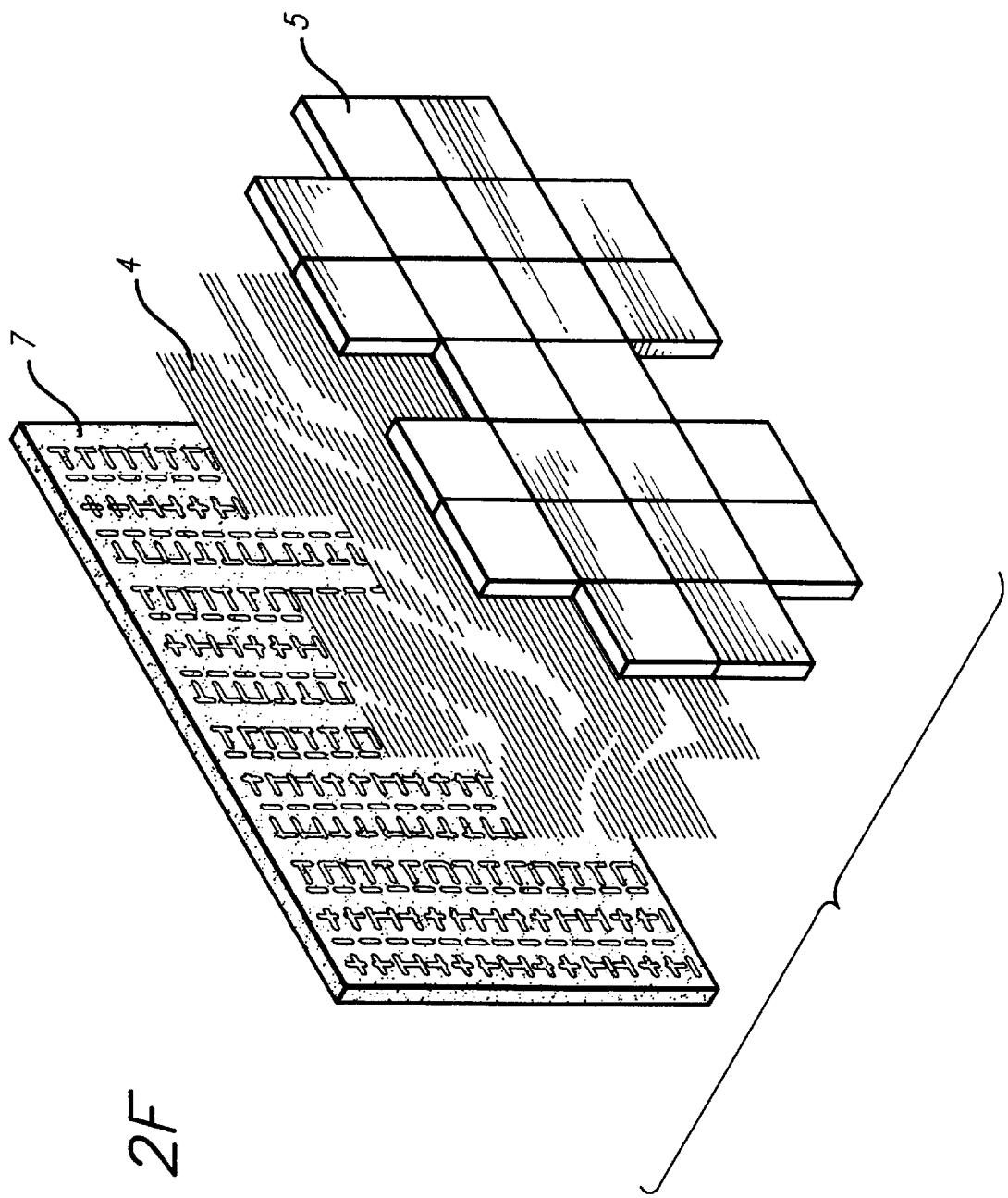
FIG. 2F is an isometric exploded view of a tile board for gypsum board walls.

Another embodiment is shown in FIG. 2F, which comprises a reinforced cementitious rigid, non-flexible backer board underlayment 7, the thin coat of cement 4 or dry-set or latex cement, which is then cured for a minimum of 20 hours at 70 degrees F or above.

The tile board of this invention conforms with the nationally recognized standard Handbook for Ceramic Tile Installation by the Tile Council of America, for walls, exterior and interior, ceilings, bathtub walls, shower receptors and walls, and countertops. It also conforms to all building codes, ordinances, climatic conditions and trade practices.

The pre-installed and pre-grouted tile board of this invention is typically 16 inches to 24 inches high, 30 inches to 48 inches wide, and one-half inch to one and one-half inches thick. It is made of waterproof, rigid, non-flexible material. A board will weigh between 25 pounds to 70 pounds, a shower pan board between 60 pounds to 90 pounds. The boards are easily handled and installed by an adult person.

The boards have pre-drilled holes for screws for fastening and leveling the boards to the surface on which they are to be placed. The openings where the screw holes are placed may be easily covered with the same layered material. Openings for plumbing fixtures as well as recessed soap and shampoo boxes are pre-made at the manufacturing plant.

Figure 3:
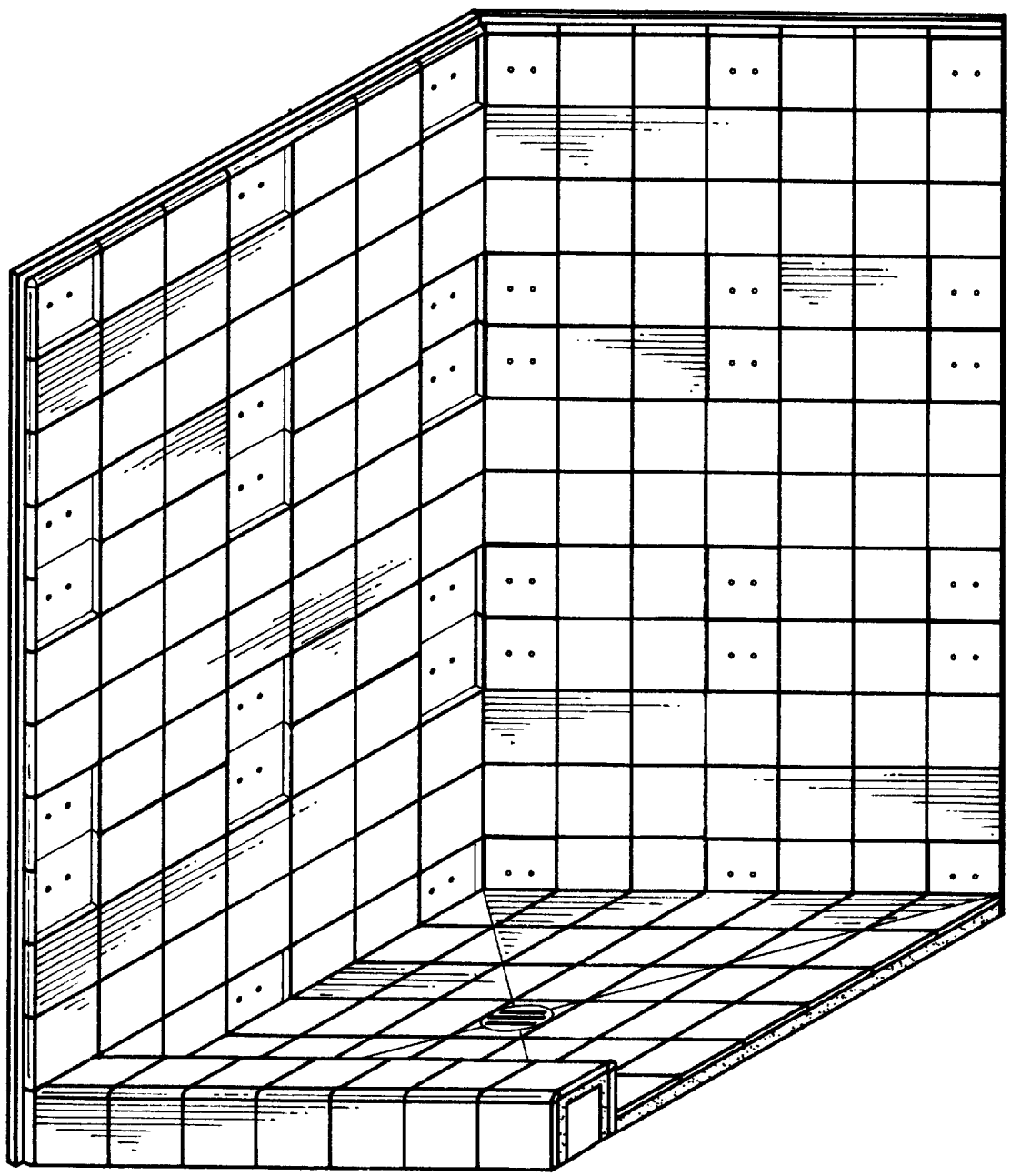
FIG. 3 is a perspective view of a shower enclosure.
Figure 3A:
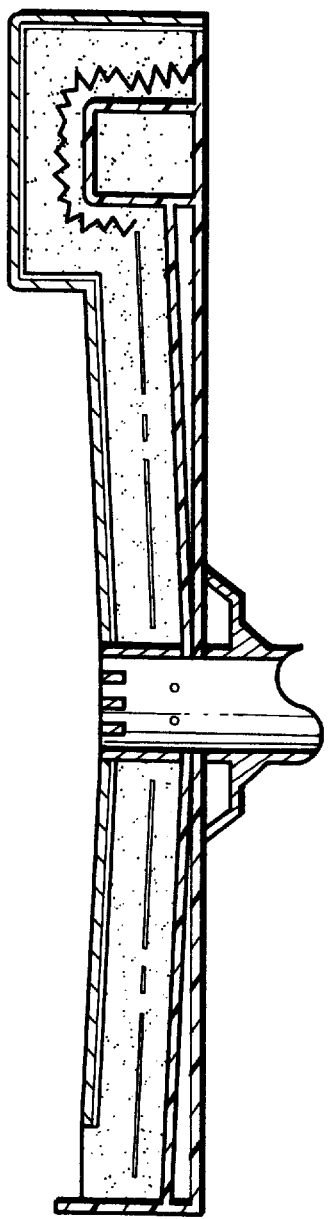
FIG. 3A is a cross-sectional view of of a shower receptor pan.
Figure 3B:
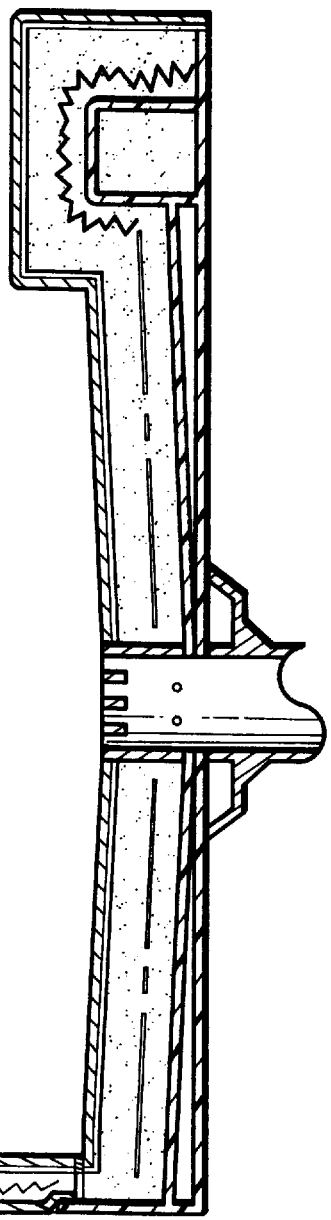
FIG. 3B is a cross-sectional view showing a tile board over the shower pan.
Figure 4:
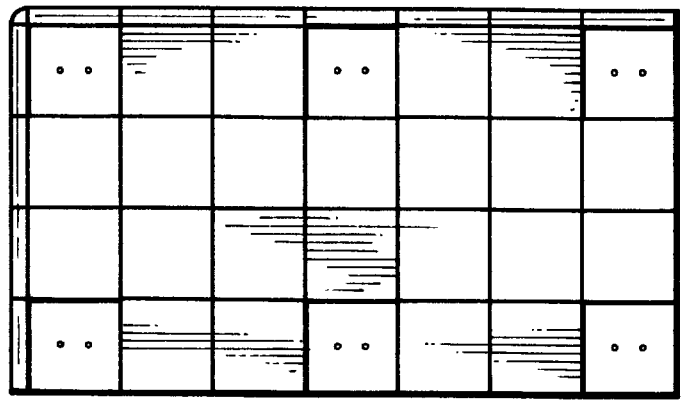
FIG. 4 is front view of a tile board fastened over gypsum board.
Figure 4A:
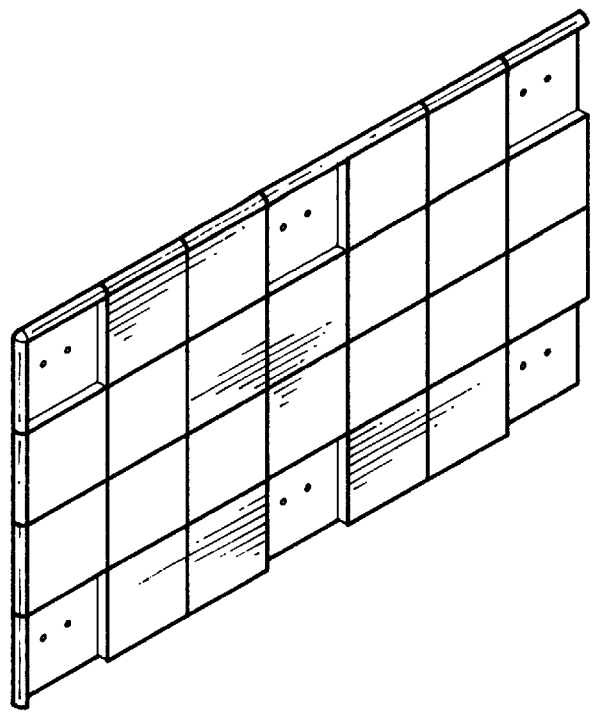
FIG. 4A is a perspective view thereof.
Figure 4B:
FIG. 4B is a cross-sectional view of FIG. 4.
Figure 5:
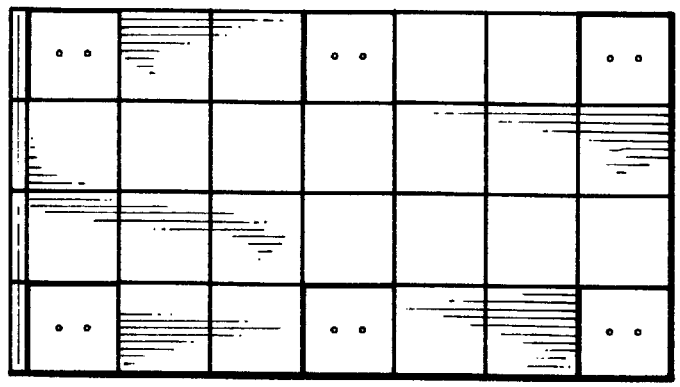
FIG. 5 is front view of a tile board for corners fastened over gypsum board.
Figure 5A:
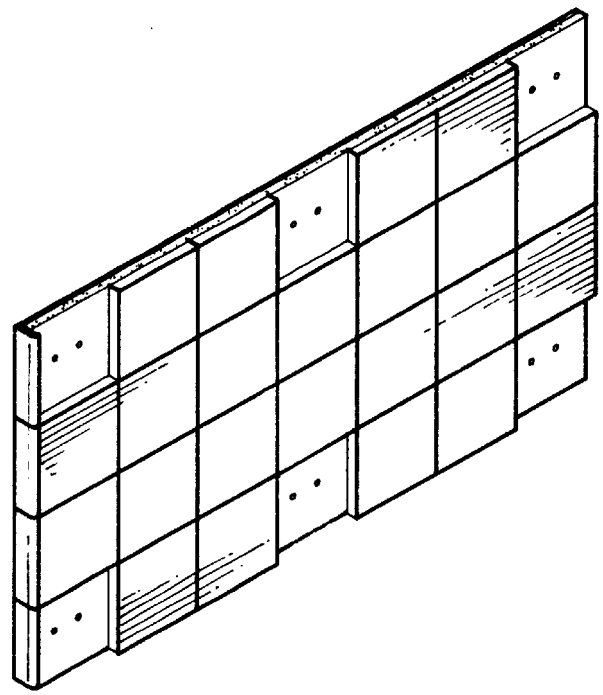
FIG. 5A is a perspective view thereof.
Figure 5B:
FIG. 5B is a cross-sectional view of FIG. 5.
Figure 6:
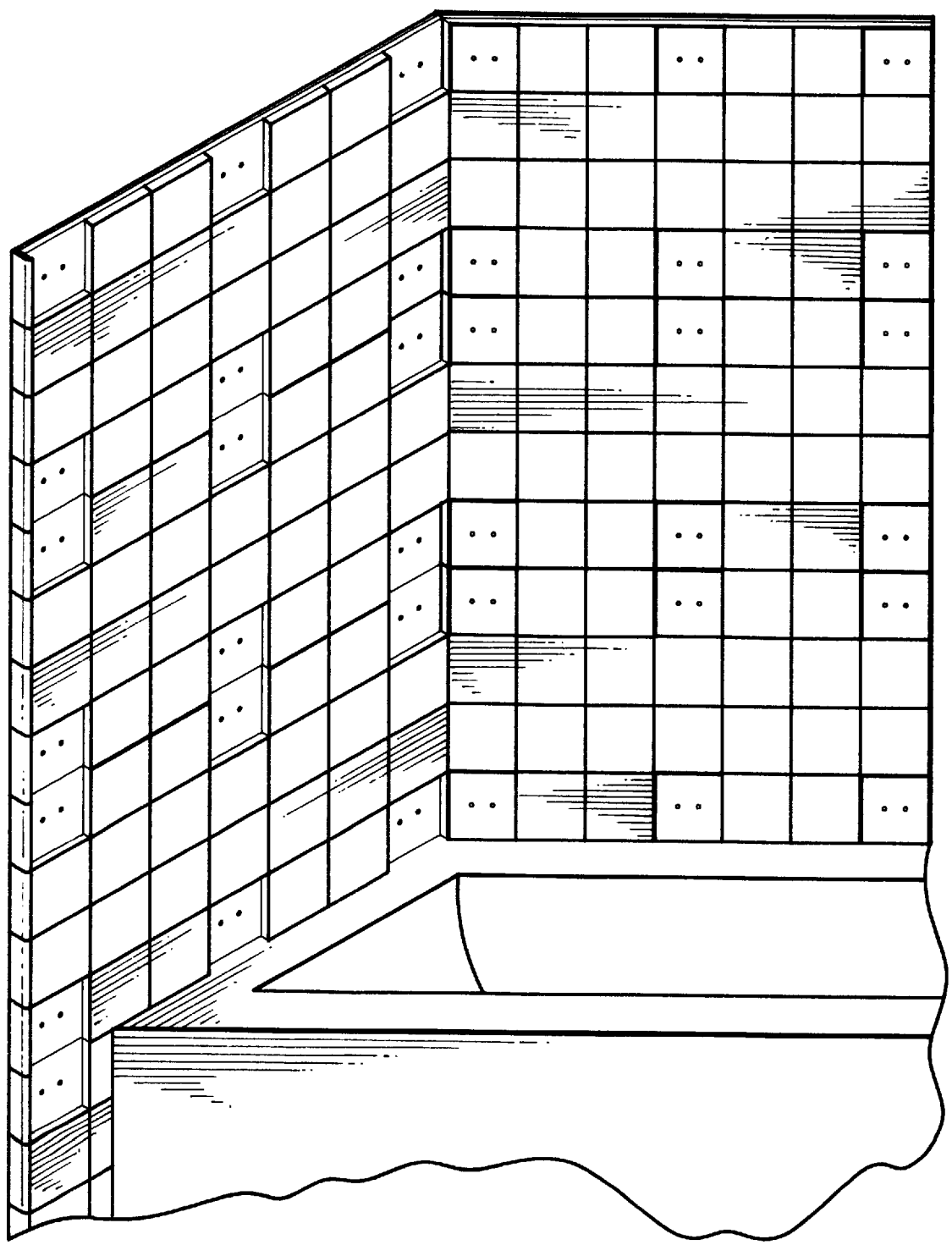
FIG. 6 is a perspective view of tile board installed on bathroom walls over gypsum board.
Figure 6A:
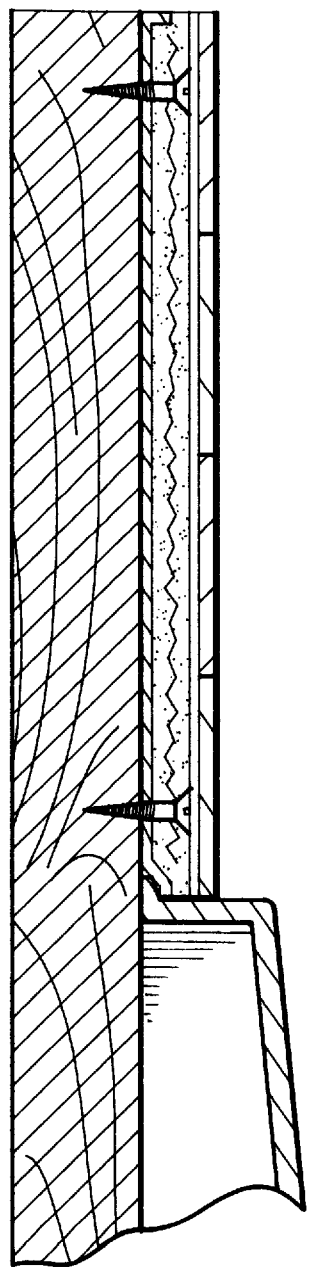
FIG. 6A is a cross-sectional view of tile board over a bathtub lip.
Figure 6B:
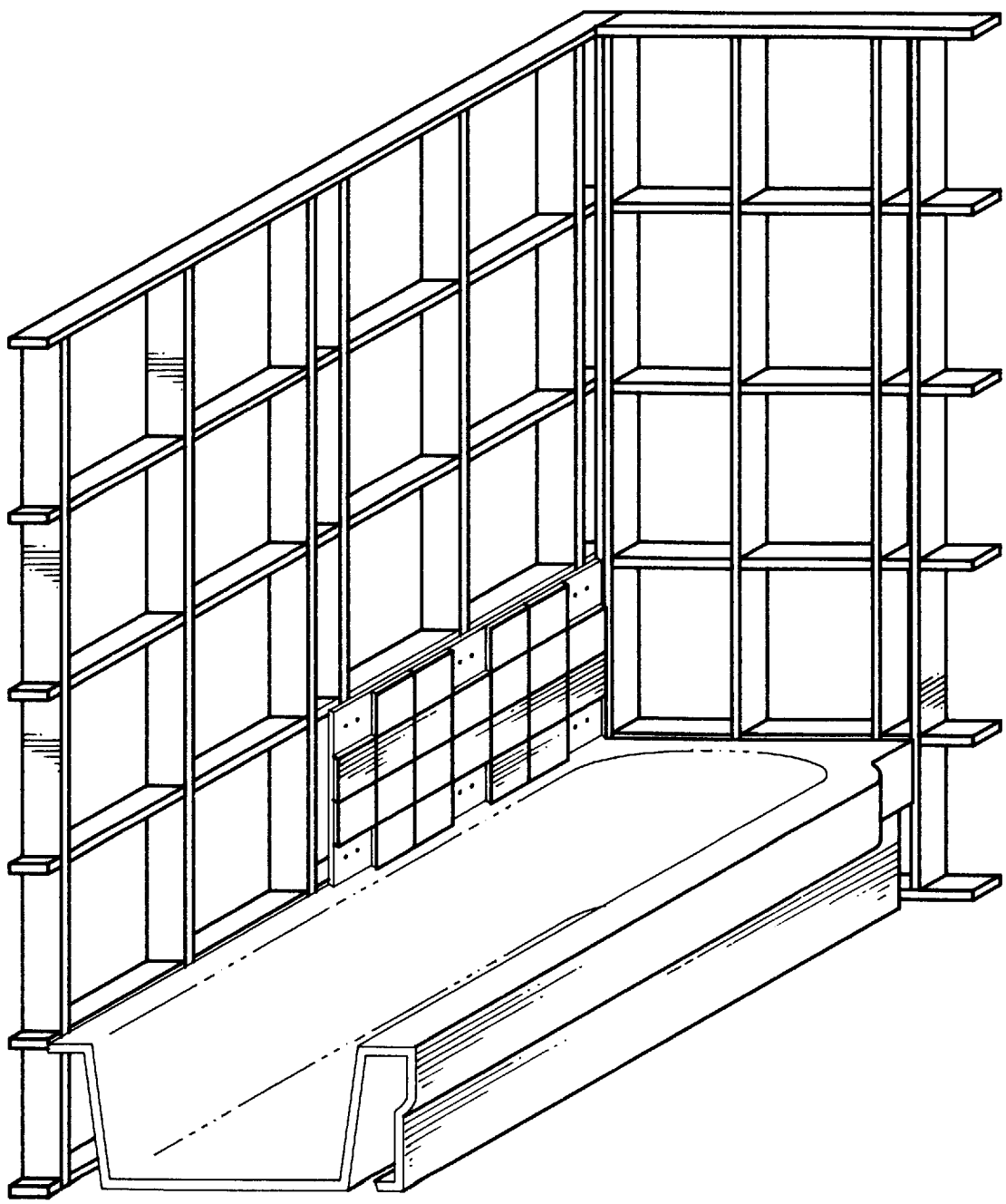
Figure 6C:
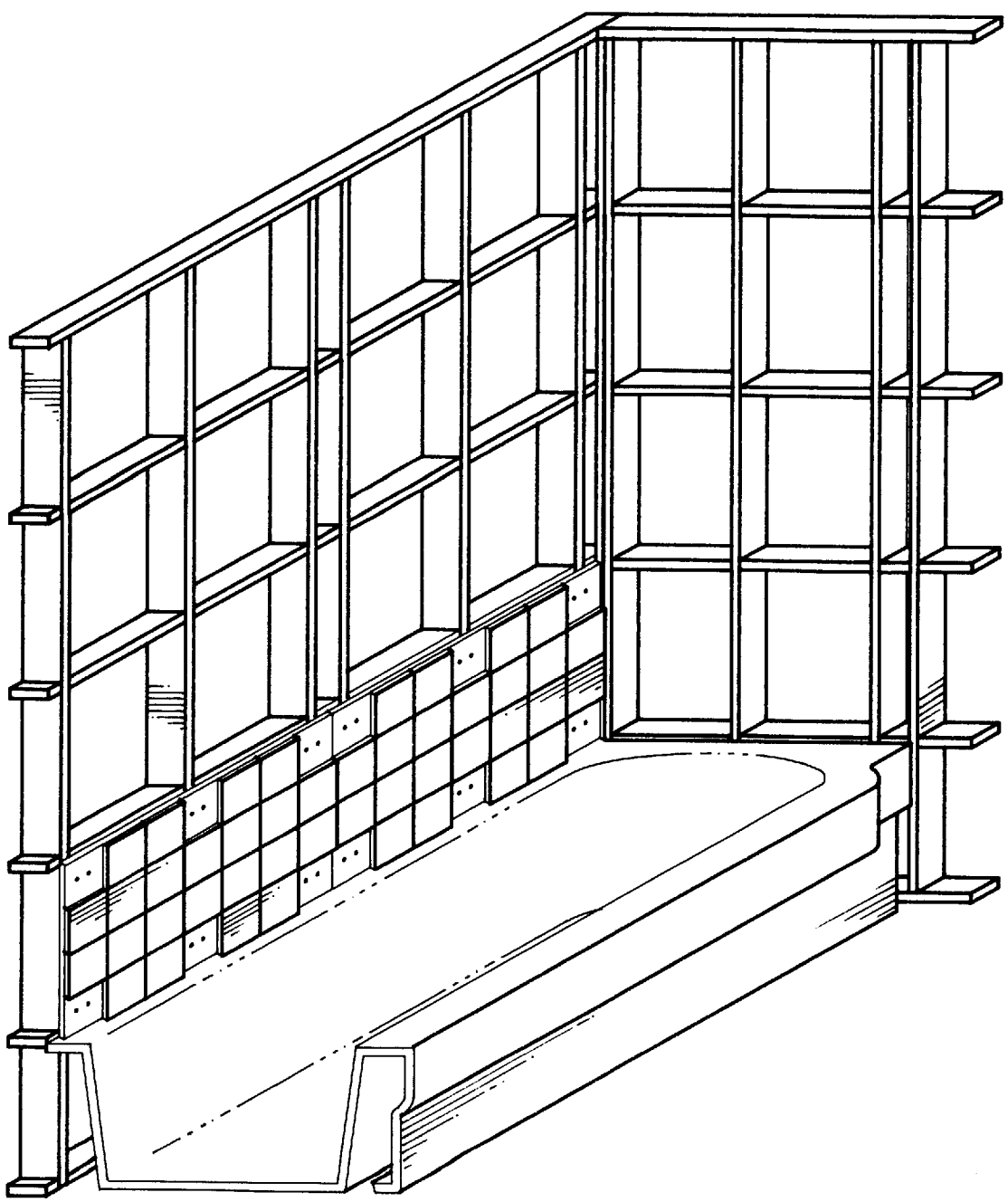
FIG. 6C shows the second board installed.
Figure 6D:
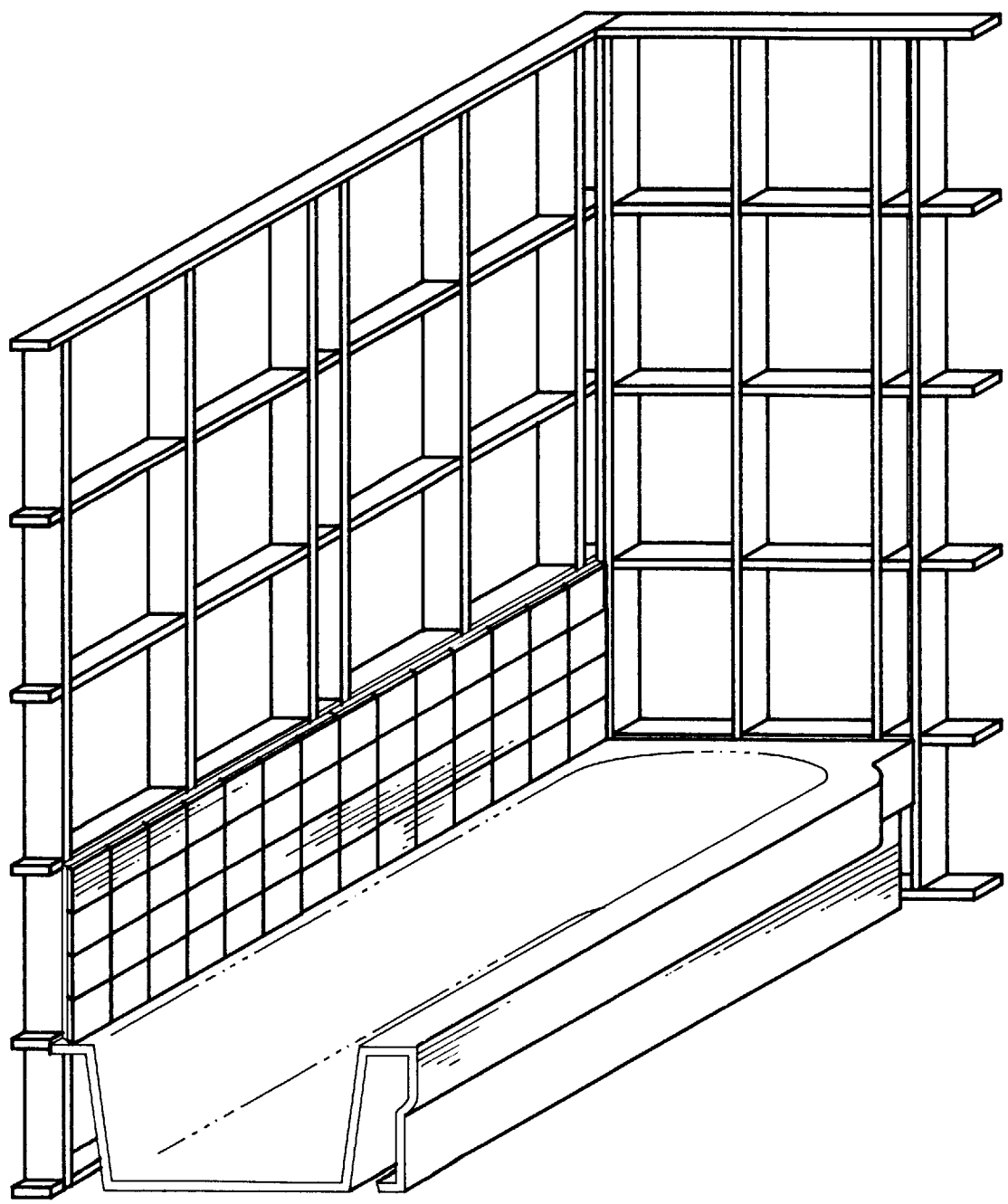
FIG. 6D shows the screw holes covered with tile.
Figure 6E:
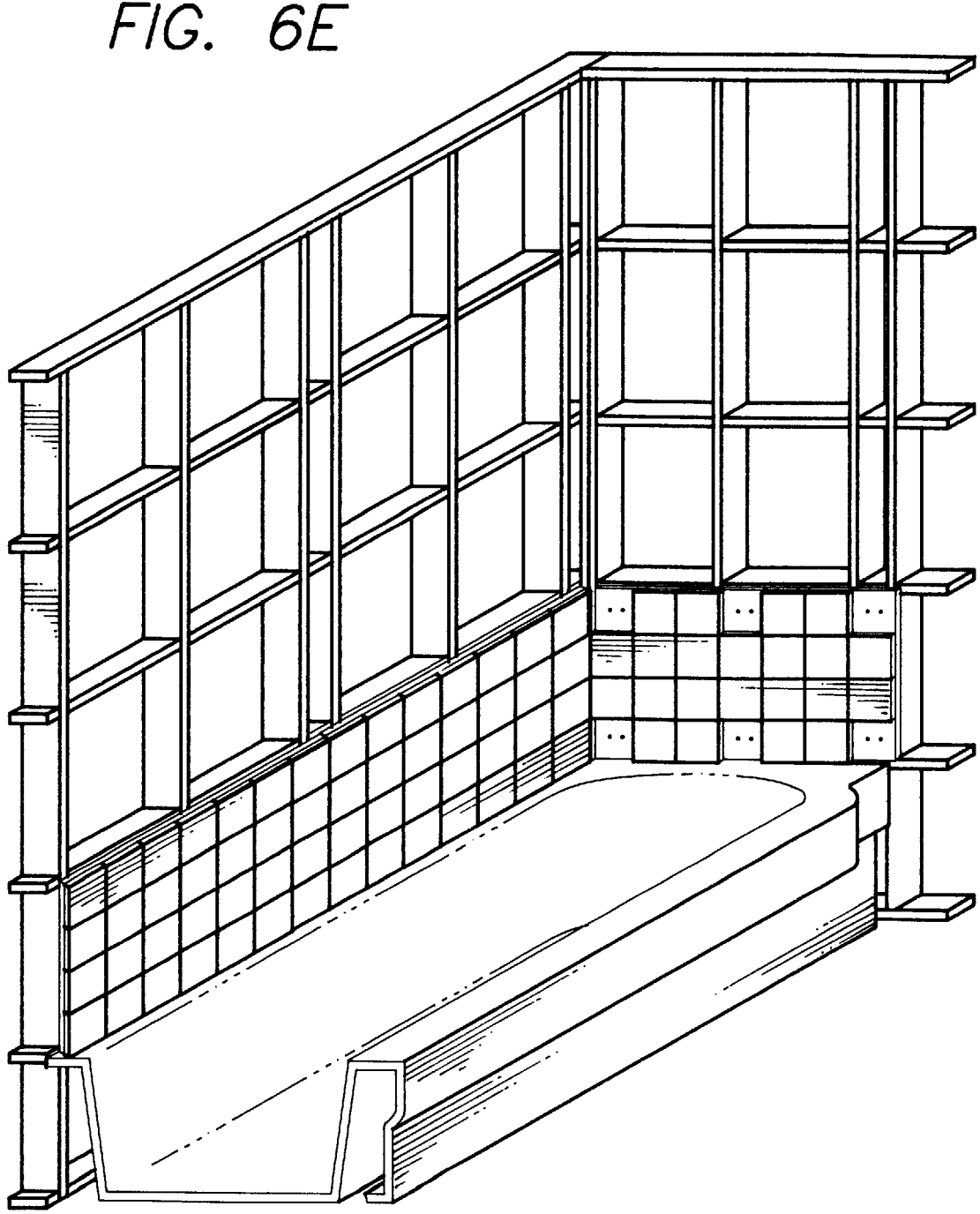
FIG. 6E shows the third board installed.
Figure 6F:
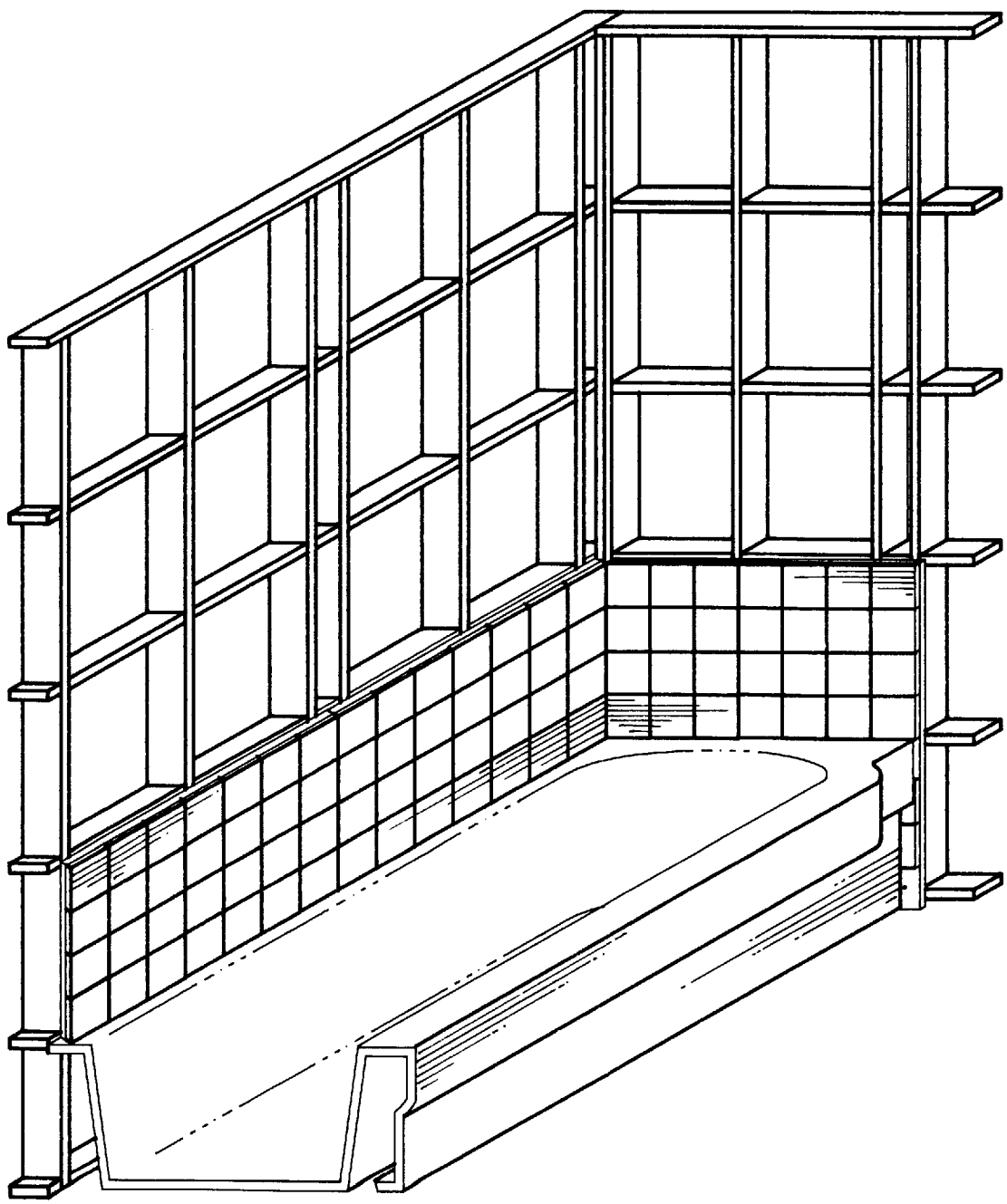
FIG. 6F shows the tile filled on the third board and the small leg fourth board.
Figure 6G:
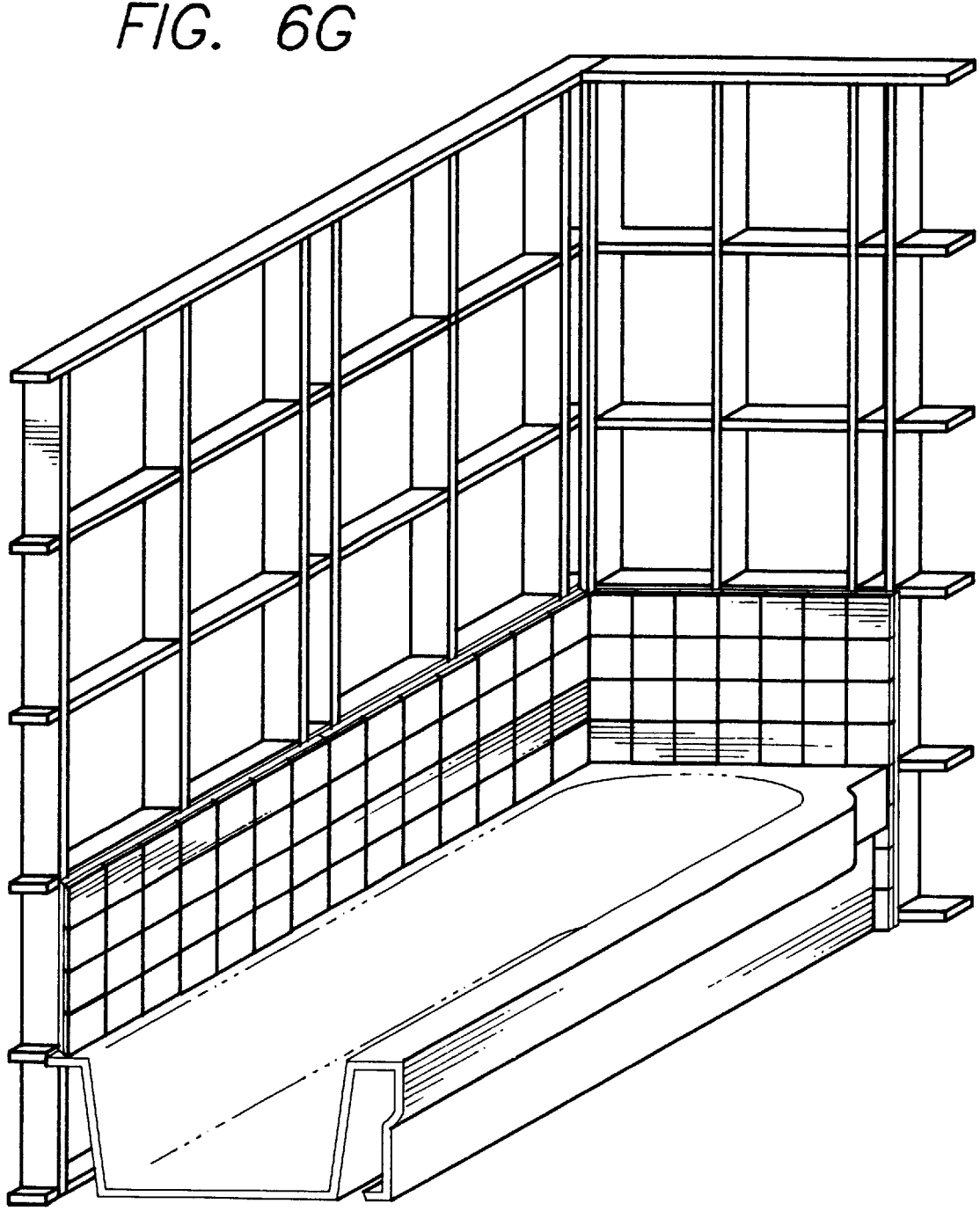
FIG. 6G shows the small leg fourth board filled with tile.
Figure 6H:
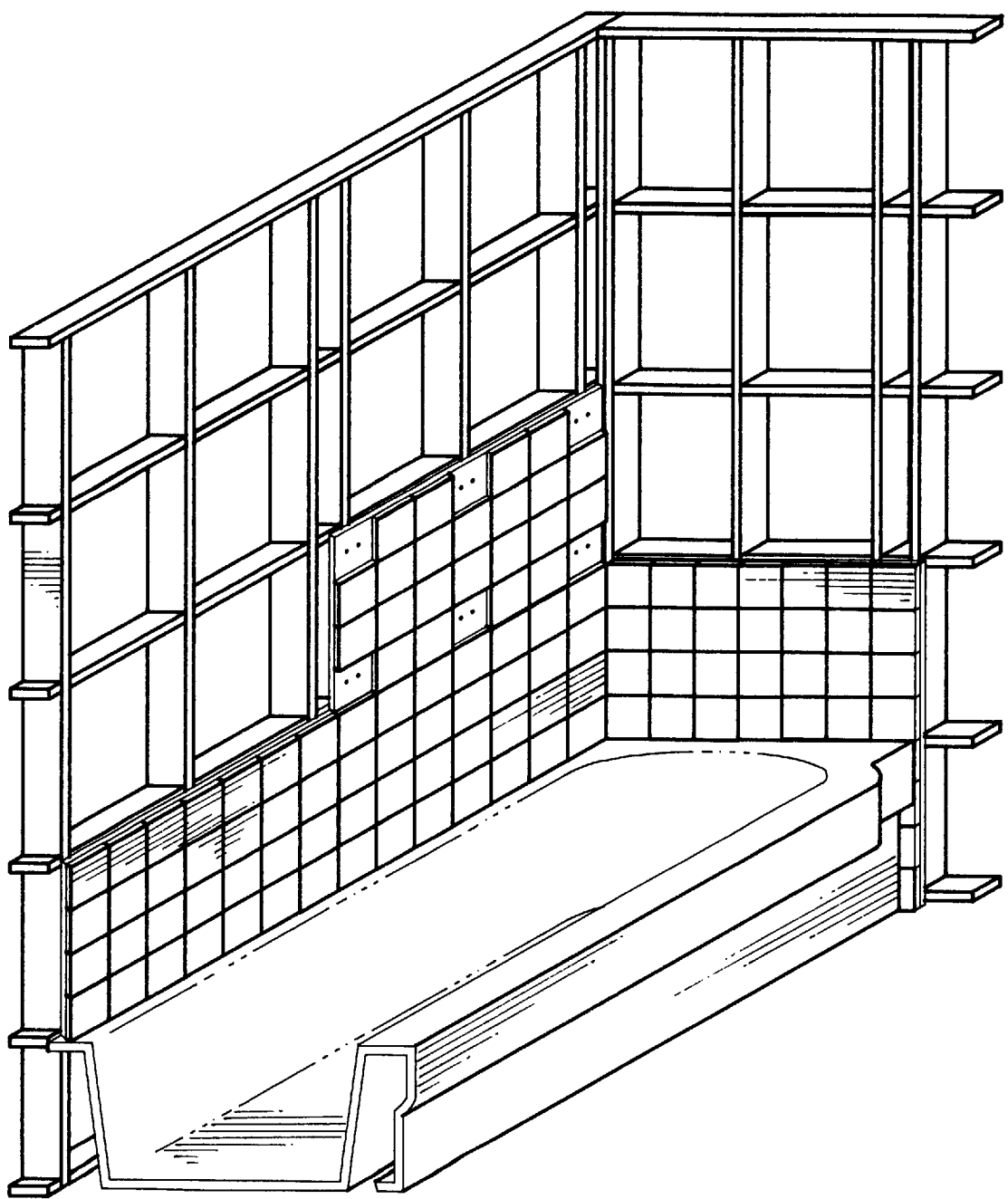
FIG. 6H shows the fifth board installed.
Figure 61:
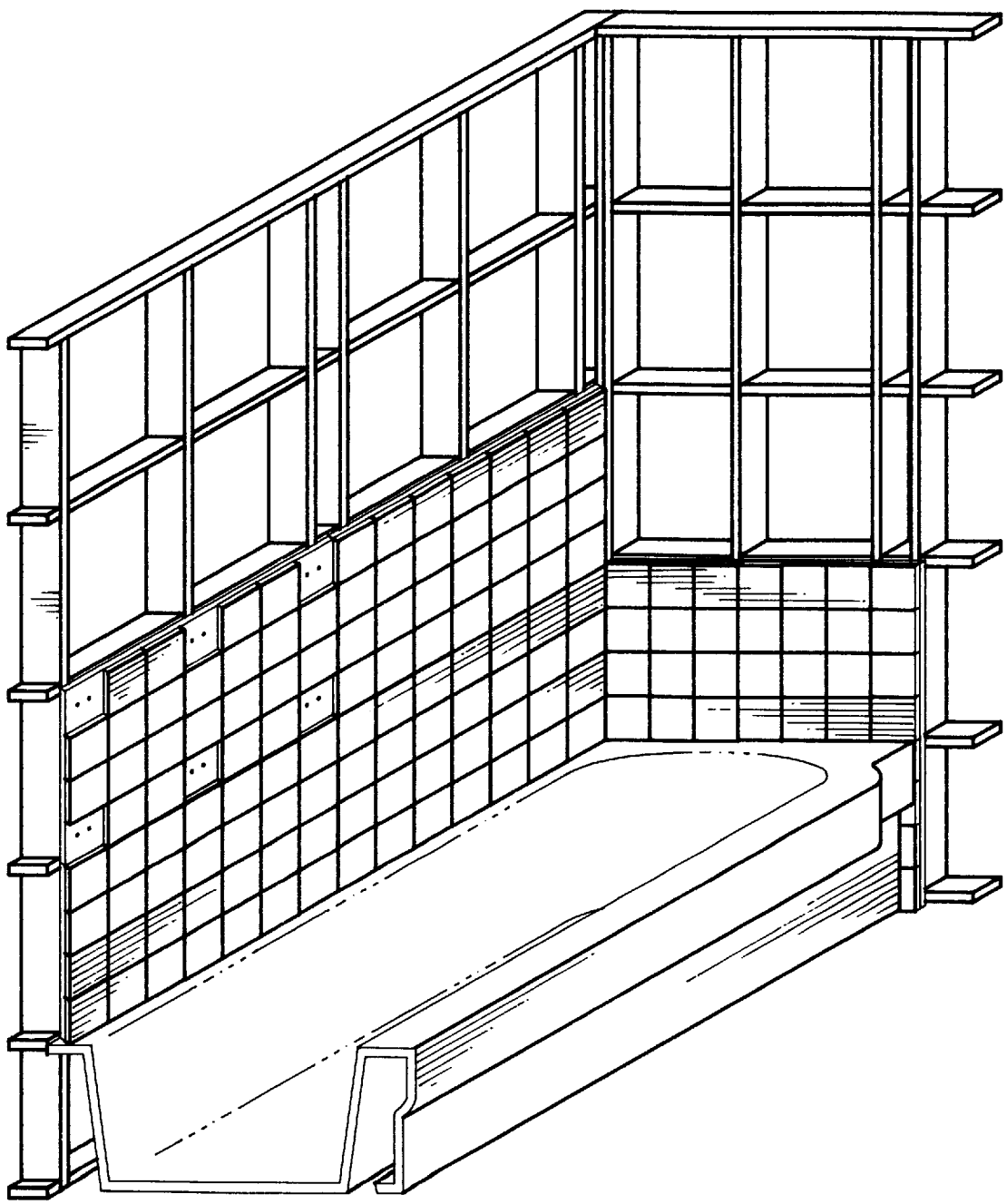
Figure 6J:
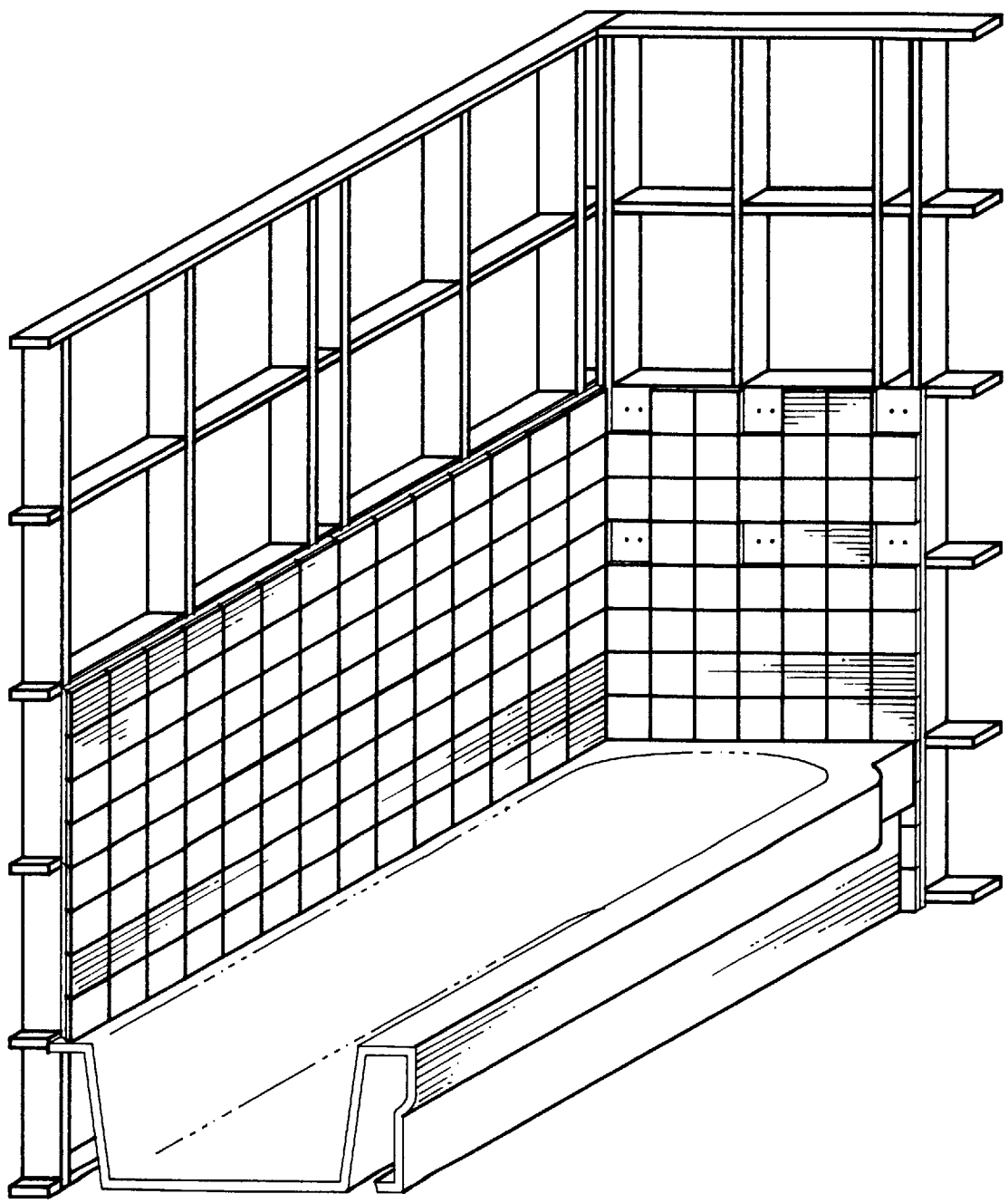
FIG. 6J shows the tile filled on the sixth board and the seventh board installed.
Figure 6K:
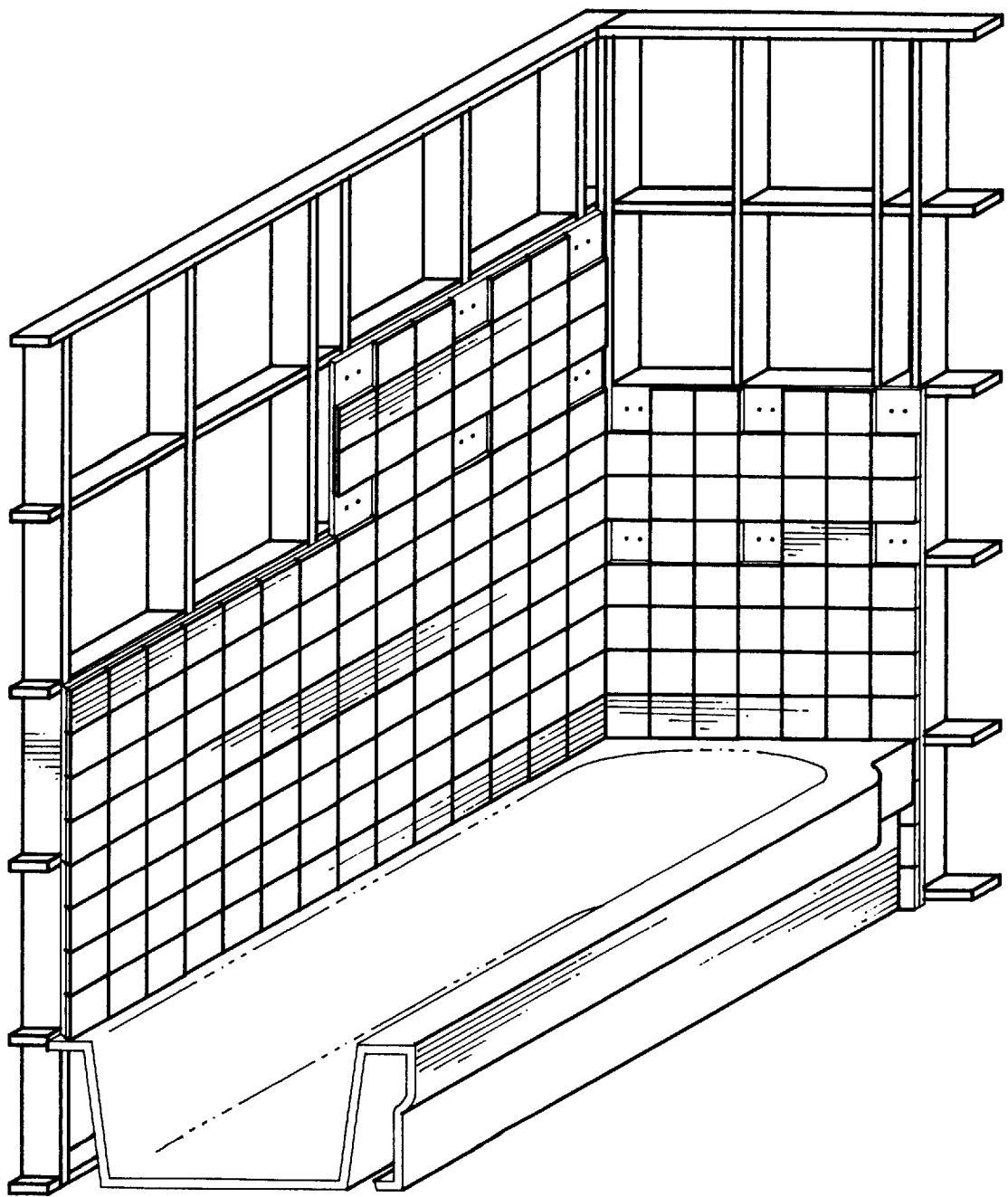
FIG. 6K shows the seventh board filled with tile and the eighth board installed.
Figure 6L:
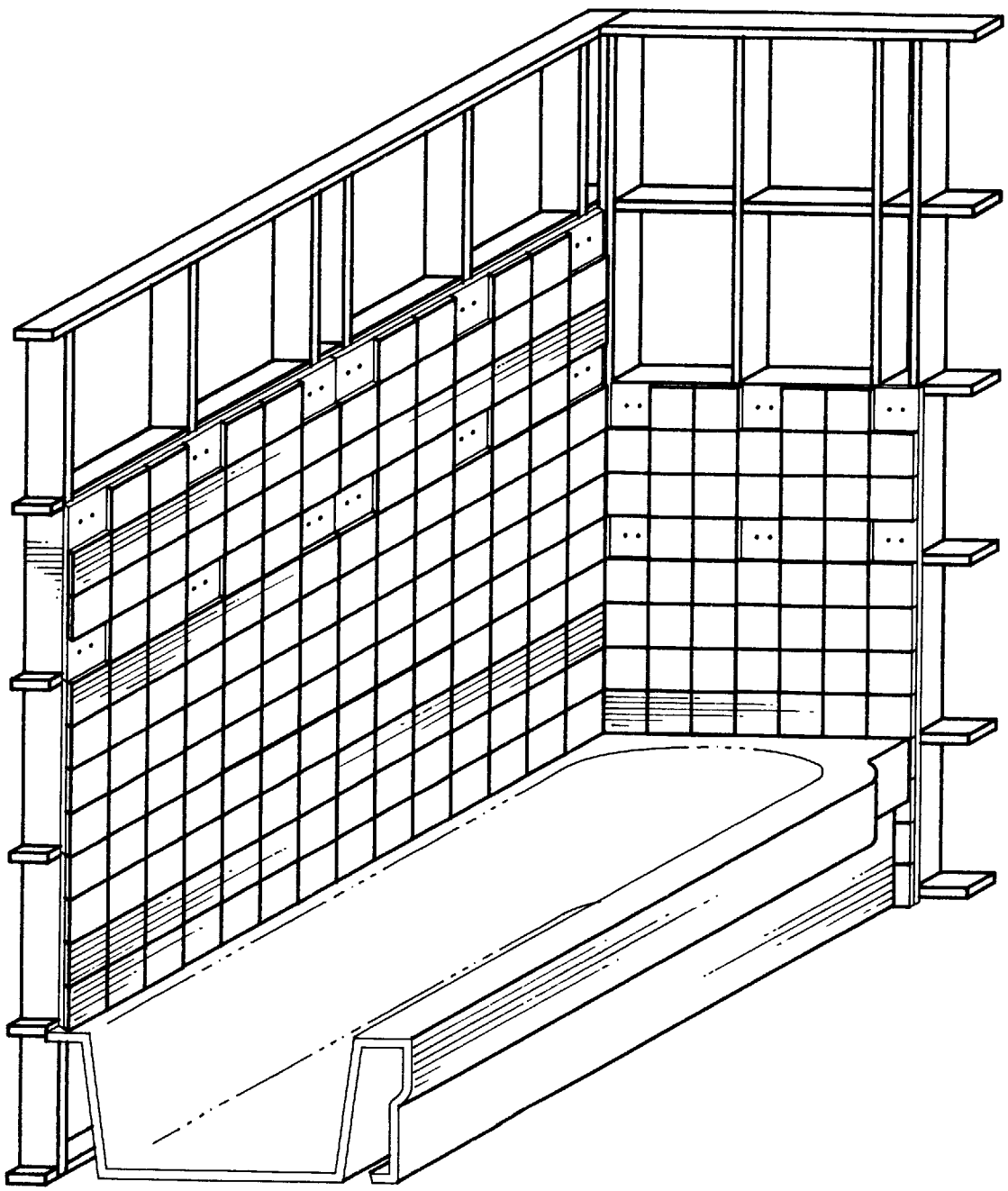
FIG. 6L shows the ninth board installed.
Figure 6M:
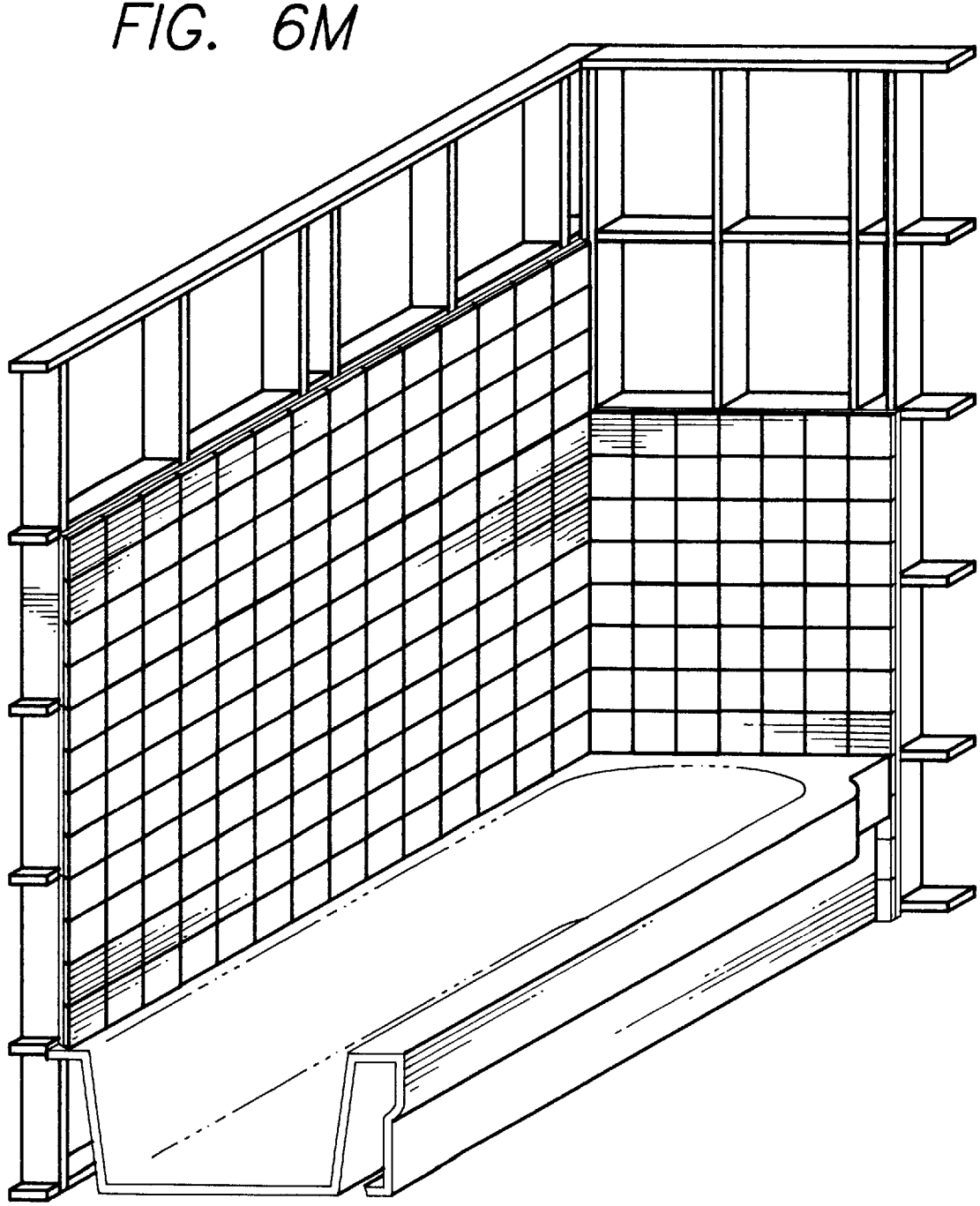
FIG. 6M shows the eighth and ninth boards filled with tile.
Figure 6N:
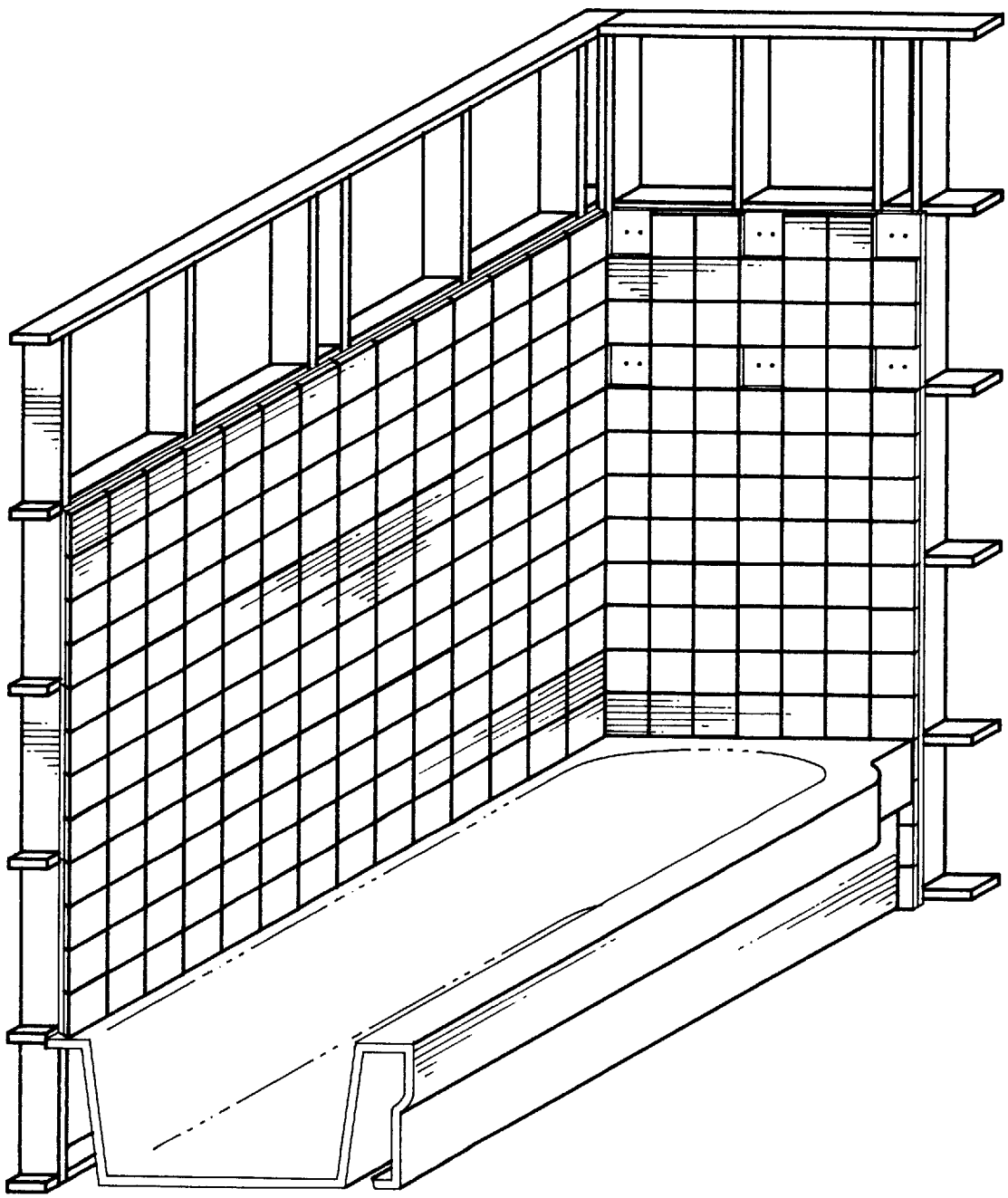
FIG. 6N shows the tenth board installed.
Figure 60:
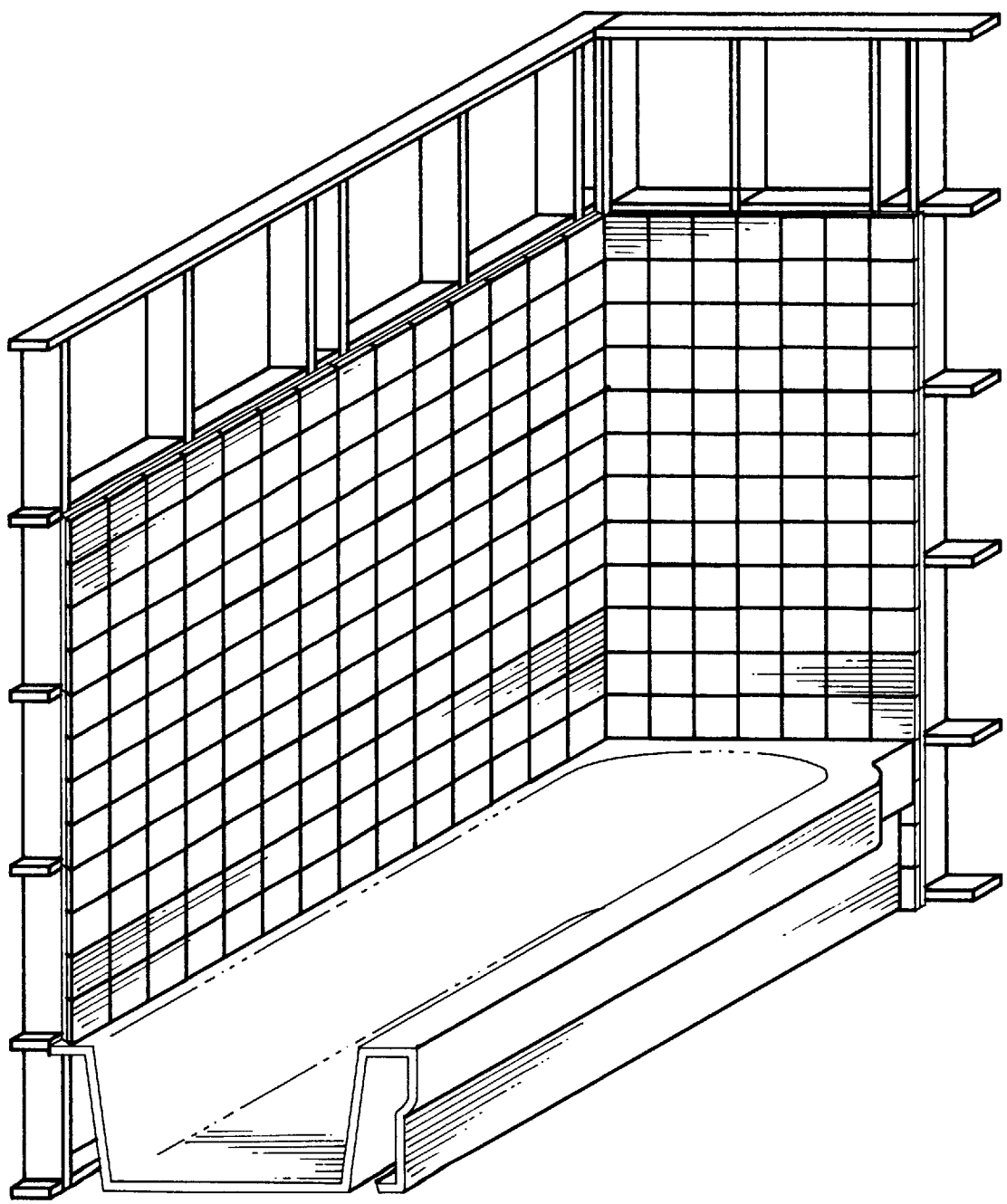

A complete installation of ceramic tile or marble in a shower enclosure, as shown in FIG. 3, can be completed in less than four hours by one experienced tile installer. A complete ceramic tile or marble installation on bathtub walls, as shown in FIG. 6B to 6O, can be completed in two hours by an experienced tile installer.

As can be seen by the method of pre-fabricated construction, using the tile board of this invention eliminates an enormous amount of contaminating waste and polluted trash. The tile board can have other shapes, such as triangular, trapezoidal, square or any other shape desired. It can come in other sizes than set forth above.

Having thus described the invention;

I claim:

1. A pre-fabricated rigid tile board adapted as a single unit to be affixed to a wall, floor, or counter comprising, a rigid base which has a solid backing and a honeycombed shaped bottom layer, a mortar bed which fills the honeycombed shaped bottom, a metal lath set into the mortar bed, a bond coat composed of a thin coat of mortar affixed to the mortar bed, and a tile material affixed to the bond coat.

2. The board of claim 1 in which the base is polyvinyl chloride.

3. The board of claim 1 in which in which the tile material comprises ceramic tile, brick-veneer, granite tile, or marble tile.

4. The board of claim 1 in which the base is a cementitious backer board.

5. The board of claim 1 in which the thin coat of mortar is dry-set or latex cement.

6. The board of claim 1 in which the base has predrilled holes adapted for use in affixing the board to a wall or counter.

7. The board of claim 6 in which the layers above the base are removed in those areas where the holes are present so that the removed layers may be attached after the board has been affixed to the wall or counter.

\* \* \* \* \*

UNITED STATES PATENT AND TRADEMARK OFFICE
CERTIFICATE OF CORRECTION

PATENT NO. : 5,816,005
DATED : October 6, 1998
INVENTOR(S) : Eddie Eui In Han

It is certified that error appears in the above-identified patent and that said Letters Patent is hereby corrected as shown below:

Title page, item [54] and col. 1, line 1, in the Title, replace "Title" with --Tile--.

Signed and Sealed this

Sixth Day of April, 1999

Attest:

Q. TODD DICKINSON

*Attesting Officer*

*Acting Commissioner of Patents and Trademarks*